US011854115B2

(12) United States Patent
Ito et al.

(10) Patent No.: US 11,854,115 B2
(45) Date of Patent: Dec. 26, 2023

(54) VECTORIZED CARICATURE AVATAR GENERATOR

(71) Applicant: Adobe Inc., San Jose, CA (US)

(72) Inventors: Daichi Ito, San Jose, CA (US); Yijun Li, Seattle, WA (US); Yannick Hold-Geoffroy, San Jose, CA (US); Koki Madono, Tokyo (JP); Jose Ignacio Echevarria Vallespi, Belmont, CA (US); Cameron Younger Smith, Santa Cruz, CA (US)

(73) Assignee: Adobe Inc., San Jose, CA (US)

( * ) Notice: Subject to any disclaimer, the term of this patent is extended or adjusted under 35 U.S.C. 154(b) by 56 days.

(21) Appl. No.: 17/519,117

(22) Filed: Nov. 4, 2021

(65) Prior Publication Data

US 2023/0140146 A1 May 4, 2023

(51) Int. Cl.
*G06T 11/00* (2006.01)
*G06T 7/10* (2017.01)
*G06V 40/16* (2022.01)

(52) U.S. Cl.
CPC .............. *G06T 11/00* (2013.01); *G06T 7/10* (2017.01); *G06V 40/171* (2022.01); *G06T 2207/20081* (2013.01); *G06T 2207/20092* (2013.01); *G06T 2207/30201* (2013.01)

(58) Field of Classification Search
CPC .......... G06T 11/00; G06T 7/10; G06V 40/171
See application file for complete search history.

(56) References Cited

U.S. PATENT DOCUMENTS

| 10,607,065 | B2 | 3/2020 | Milman et al. | |
|---|---|---|---|---|
| 2009/0309878 | A1* | 12/2009 | Otani | H04N 23/611 345/427 |
| 2016/0027046 | A1* | 1/2016 | Huang | G06Q 30/0201 705/14.49 |
| 2019/0340419 | A1* | 11/2019 | Milman | G06T 13/80 |
| 2020/0327251 | A1* | 10/2020 | Martin-Lopez | H04L 9/3239 |
| 2020/0342223 | A1* | 10/2020 | Mixter | G06F 3/167 |
| 2021/0201195 | A1* | 7/2021 | Vengertsev | G06N 3/04 |
| 2021/0279934 | A1* | 9/2021 | Long | G06N 3/045 |

OTHER PUBLICATIONS

"Facebook Avatar", Facebook.com [retrieved Sep. 20, 2021]. Retrieved from the Internet <https://www.facebook.com/avatarmaker.net/>., May 13, 2020, 7 Pages.

(Continued)

*Primary Examiner* — Yi Yang
(74) *Attorney, Agent, or Firm* — FIG. 1 Patents

(57) ABSTRACT

A vectorized caricature avatar generator receives a user image from which face parameters are generated. Segments of the user image including certain facial features (e.g., hair, facial hair, eyeglasses) are also identified. Segment parameter values are also determined, the segment parameter values being those parameter values from a set of caricature avatars that correspond to the segments of the user image. The face parameter values and the segment parameter values are used to generate a caricature avatar of the user in the user image.

20 Claims, 5 Drawing Sheets

(56) References Cited

OTHER PUBLICATIONS

"Nintendo Miis", Nintendo [retrieved Sep. 20, 2021]. Retrieved from the Internet <https://play.nintendo.com/themes/friends/miis/>., 2006, 16 Pages.

"Zepeto", Naver Z Corp. [retrieved Sep. 20, 2021]. Retrieved from the Internet <https://zepeto.me/>., Aug. 2018, 2 Pages.

Cao, Zhe et al., "OpenPose: Realtime Multi-Person 2D Pose Estimation using Part Affinity Fields", Cornell University, arXiv Preprint, arXiv.org [retrieved Oct. 25, 2021]. Retrieved from the Internet <https://arxiv.org/pdf/1812.08008>., Dec. 18, 2018, 14 pages.

Guo, Jianzhu et al., "The official PyTorch implementation of Towards Fast, Accurate and Stable 3D Dense Face Alignment, ECCV 2020", GitHub, Inc., Uploaded by cleardusk [retrieved Oct. 25, 2021]. Retrieved from the Internet <https://github.com/cleardusk/3DDFA_V2>., Aug. 31, 2020, 9 pages.

Howard, Andrewg et al., "MobileNets: Efficient Convolutional Neural Networks for Mobile Vision Applications", Cornell University, arXiv Preprint, arXiv.org [retrieved Sep. 3, 2021]. Retrieved from the Internet <https://arxiv.org/pdf/1704.04861>., Apr. 2017, 9 Pages.

Li, Hao et al., "Avatar Digitization From a Single Image For Real-Time Rendering", ACM Transactions on Graphics, vol. 36, No. 6, Article 1 [retrieved Sep. 21, 2021]. Retrieved from the Internet <http://www.hao-li.com/publications/papers/siggraphAsia2017ADFSIFRTR.pdf>., Nov. 2017, 14 Pages.

Tillman, Maggie , "What are Animoji? How to create and use Apple's animated emoji", Pocket-lint [retrieved Sep. 20, 2021]. Retrieved from the Internet <https://www.pocket-lint.com/apps/news/apple/142230-what-are-animoji-how-to-use-apple-s-animated-emoji>., Sep. 3, 2021, 14 Pages.

\* cited by examiner

VECTORIZED CARICATURE AVATAR GENERATOR

BACKGROUND

As computer technology has advanced people have found new ways to use their computers. One way some people use their computers is to generate avatars of themselves for use in various programs or online applications. While various techniques exist for generating avatars for users, these techniques are not without their problems. One such problem is that conventional solutions oftentimes involve users selecting from various presets, which is time consuming for the user to browse through the available presets and oftentimes results in the avatar not preserving the identity of the user in the manner the user would like. These problems with conventional solutions for generating avatars for users oftentimes results in user dissatisfaction and frustration with their avatars and applications generating their avatars.

SUMMARY

To mitigate the drawbacks of conventional solutions for generating avatars, a vectorized caricature avatar generator as implemented by a computing device is described. An image including a user face is received and, for each of multiple face parameters a face parameter value based on the user face is generated. A segment of the image that identifies a facial feature of the user face is identified, the facial feature being hair, facial hair, or eyeglasses. Segment parameter values for the segment of the image are determined by identifying face parameter values of a caricature avatar corresponding to the segment of the image. A vector image that is a caricature avatar of the user is generated from the face parameter values and the segment parameter values.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
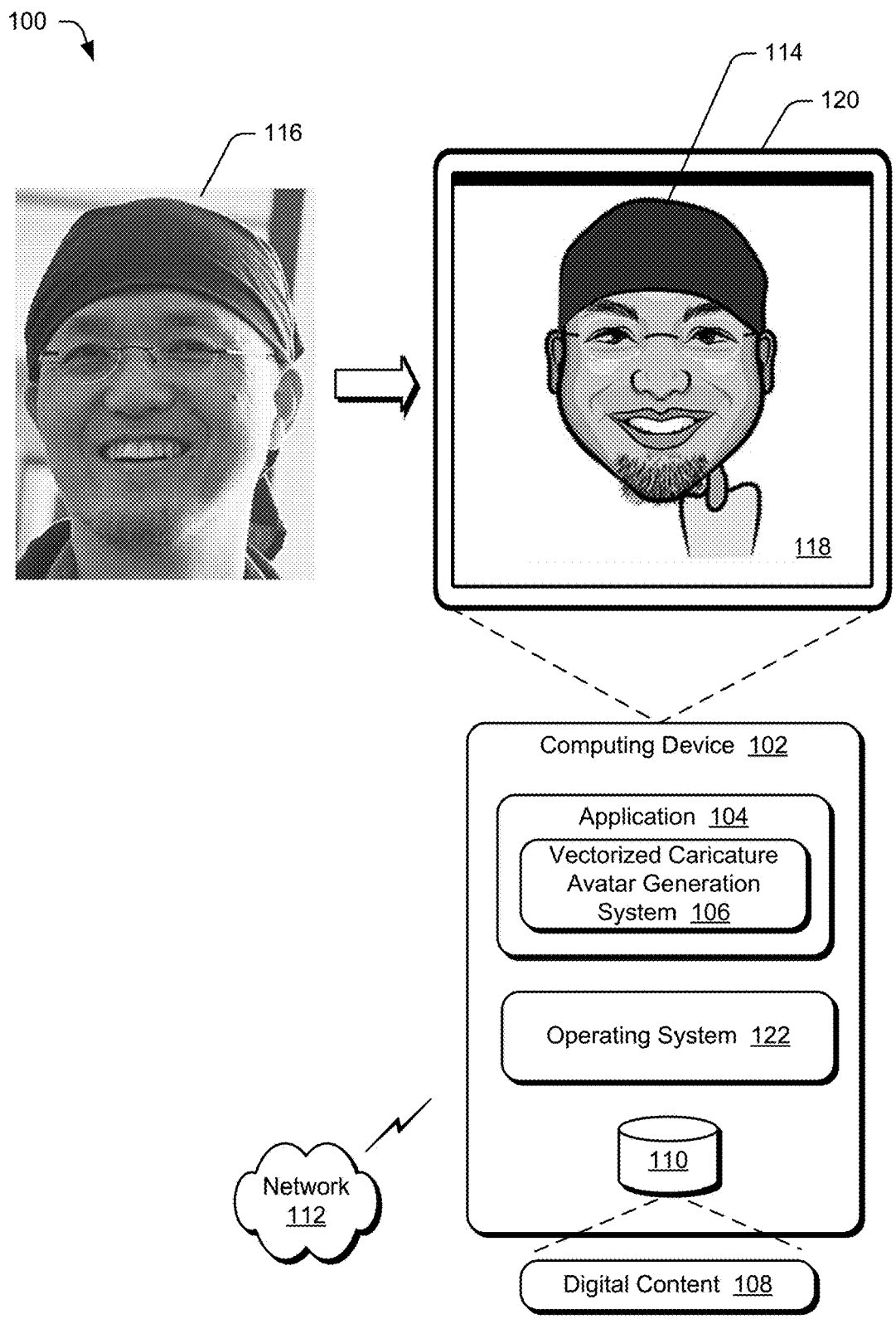
FIG. 1 is an illustration of a digital medium environment in an example implementation that is operable to employ the vectorized caricature avatar generator described herein.

A vectorized caricature avatar generator is discussed herein. Generally, the vectorized caricature avatar generator receives a user image from which face parameters are generated. Segments of the user image including certain facial features (e.g., hair, facial hair, eyeglasses) are also identified. Segment parameter values are also determined, the segment parameter values being those parameter values from a set of caricature avatars that correspond to the segments of the user image. The face parameter values and the segment parameter values are used to generate a caricature avatar of the user in the user image.

More specifically, image encodings are generated from a user image. To generate the image encodings, dense key points from the user image are identified. The dense key points are a representation of the geometry of the user (e.g., the face of the user) in the user image, the key points providing a mapping of the face of the user. In one or more implementations, the dense key points are a mapping of the entire face, e.g., indicating where each centimeter (or other granularity, such as every five millimeters) of the face is rather than only the location of particular facial features (e.g., the nose, the eyes, the mouth, etc.).

The facial texture of the face of the user in the user image is also extracted. In one or more implementations, the facial texture is extracted as a set of vectors that is a representation of the face. The set of vectors are generated, for example, using an ArcFace (Additive Angular Margin Loss) technique.

The dense key points and the facial texture (e.g., the set of vectors) are used to generate face parameter values for the face in the user image. The face parameters are different aspects or characteristics of the face of a user that are considered useful in generating a caricature avatar (e.g., considered useful by a designer or developer of the vectorized caricature avatar generation system, by an artist generating caricature avatars for the vectorized caricature avatar generation system, and so forth). The values of the face parameters are altered to alter the appearance of the caricature avatar.

In one or more implementations, a machine learning system such as a multi-layer perceptron is used to generate the face parameter values. The machine learning system is trained using training data that includes multiple user images and corresponding known face parameter values for the user images. The machine learning system is trained, for example, by updating weights or values of hidden layers of the machine learning system to minimize the loss (e.g., mean squared error loss) between known face parameter values for users in the user images and the face parameter values generated by the machine learning system for the users in the user images.

The known face parameter values are generated, for example, manually by an artist generating caricature avatars for the users in the training data user images. As an example, a user interface of a procedural caricature generator is displayed to an artist allowing the artist to provide input changing any of the face parameter values for a user image of the training data. In response to a change in a face parameter value, the procedural caricature generator generates and displays a caricature avatar based on the changed parameter values allowing the artist to repeatedly alter face parameter values until he or she is happy with the resultant caricature avatar.

Image segments are also extracted from the user image. The image segments are portions of the user image that include certain facial features. In one or more implementations, the image segments are portions of the user image that include one or more of hair, facial hair (e.g., mustache or beard), and eyeglass features. Additionally or alternatively, the image segments include portions of the user image that include other features, such as piercings, hats, and so forth. An image segment is generated for each such feature included in the user image.

Segment encodings are generated that are the facial texture of each of the image segments. In one or more implementations, the facial texture is extracted as a set of vectors that is a representation of the face. The set of vectors are generated, for example, using an ArcFace (Additive Angular Margin Loss) technique.

The facial texture (e.g., the set of vectors) are provided to a mapping module that generates segment parameter values for the image segments based on artist data. The segment parameter values are generated, for example, based on a machine learning system. The artist data includes caricature avatar parameter values generated, for example, manually by an artist generating caricature avatars for the users in the user images. The caricature avatars generated manually include various different types of hair features, such as different lengths of hair, different types of hair (e.g., curly or straight), no hair (e.g., bald), and so forth.

In one or more implementations, the mapping module includes a machine learning system that is a multi-layer perceptron. The machine learning system is trained using training data that includes image segments from user images and corresponding known face parameter values for the image segments. The known face parameter values for the image segments are generated, for example, manually by an artist generating caricature avatars for the users in the user images.

The mapping module generates segment parameter values for the segment encodings. These segment parameter values are also referred to as intermediary segment parameter values or internal segment parameter values because they are not output as segment parameter values for the segments. Rather, the mapping module compares the intermediary segment parameter values to the caricature avatar segment parameter values obtained as artist data and identifies the caricature avatar segment parameter values that are most similar to (e.g., closest to) the intermediary segment parameter values. In one or more implementations, the mapping module determines the similarity of the intermediary segment parameter values to each of the caricature avatar segment parameter values by determining the distance (e.g., cosine distance) between the intermediary segment parameter values and each of the caricature avatar segment parameter values. The mapping module selects the caricature avatar segment parameter values having the smallest distance to the intermediary segment parameter values and outputs the selected caricature avatar segment parameter values as the segment parameter values.

A caricature avatar is generated from the face parameter values and the segment parameter values. In one or more implementations, the caricature avatar is generated by determining the outline of the face and various portions of the face (e.g., eyes, nose, wrinkles) from the face parameter values. Using the location and size values for the various portions included in the face parameter values, for some portions of the face (e.g., areas such as pupils, eyes, nose, lips) the appropriate outline of the portion and color within the outline is included in the caricature avatar. For other portions (e.g., wrinkles or lines), using the location and size values for those portions the appropriate lines are included in the caricature avatar the appropriate lines.

Similarly, the parameter values for certain facial features (e.g., eyeglasses, hair, facial hair) from the segment parameter values. The appropriate lines and colors are analogously included in the caricature avatar, except that the parameter values are included in segment parameter values rather than face parameter values.

The caricature avatar is saved in any of a variety of different formats for subsequent rendering on a computing device. For example, in some situations the caricature avatar is saved as an Adobe® Photoshop® image editing application file (e.g., a PSD file).

In one or more implementations, post-processing functionality allows a user to generate multiple different versions of the caricature avatar each having different parameter values. The user is thus able to provide inputs to allow the user to change the caricature avatar. For example, user input indicating that an eyes open/closed parameter value is to be changed from "open" to "closed", or an eye size parameter value is to be changed from 50 to 0, is received to change the eyes of the user in the caricature avatar from being open to being closed. By way of another example, user input indicating that mouth location parameter values are to be changed are received to change the user in the caricature avatar from not smiling to smiling.

Each of the caricature avatars resulting from such changes is saved, resulting in multiple different versions of the caricature avatar for the user. This allows animated caricature avatars to be displayed for the user, such as alternating between a caricature avatar with the user's eyes open and a caricature avatar with the user's eyes closed to animate the caricature avatar to appear to be blinking. Any of a variety of computer animation techniques or programs are usable to animate the caricature avatar based on the multiple different versions of the caricature avatar, such as the Adobe® Character Animator computer animation application.

The techniques discussed herein allow caricature avatars that are vector images to be generated. Such caricature avatars are resolution independent and scalable to different sizes without introducing artifacts or noise. Further the caricature avatars are generated based on extracting various data regarding the face of the user from an image. The user need not spend time to identify particular preset features from a large number of possible preset features to include in their caricature avatar.

Furthermore, the techniques discussed herein allow machine learning systems to be trained faster and using a smaller amount of training data than techniques that are analyzing pixels of the user images (e.g., hundreds of thousands of pixels or more). This is a result of using a relatively small number of face parameters associated with each user image (e.g., on the order of a few hundred or several hundred). For example, the machine learning systems are trained using on the order of 200 or 300 training user images and corresponding known face parameter values.

Term Descriptions

These term descriptions are provided for purposes of example only and are not intended to be construed as limiting on the scope of the claims.

The term "caricature avatar" refers to an image that represents a user and in which characteristics of the user are exaggerated. For example, the characteristics are exaggerated to create a ludicrous or comic effect.

The term "vectorized caricature avatar" refers to a caricature avatar that is a vector image. For example, the caricature avatar is defined by a set of vectors.

The term "face parameter" refers to an aspect or characteristic of the face of a user that is considered useful in generating a caricature avatar. The face parameters are specified, for example, by a designer or developer of a vectorized caricature avatar generation system, by an artist generating caricature avatars for training a machine learning system in a caricature avatar generation system, and so forth. The face parameters include, for example, aspects or characteristics of the face regarding the user's eyes, nose, mouth, ears, wrinkles, and so forth.

The term "segment of an image" refers to a portion of the image that identifies a facial feature of the user. For example, segments of an image include the user's hair, the user's facial hair, the user's eyeglasses, and so forth.

In the following discussion, an example environment is first described that employs examples of techniques described herein. Example procedures are also described which are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the vectorized caricature avatar generator described herein. The illustrated environment 100 includes a computing device 102, implemented in any of a variety of ways. Examples of the computing device 102 include a mobile device (e.g., assuming a handheld configuration such as a tablet or mobile phone), a wearable device (e.g., augmented reality or virtual reality headsets, smartwatches), a laptop computer, a desktop computer, a game console, an automotive computer, and so forth. Thus, implementations of the computing device 102 range from full resource devices with substantial memory and processor resources (e.g., personal computers, game consoles) to a low-resource device with limited memory and/or processing resources (e.g., mobile devices). Additionally, although a single computing device 102 is shown, additionally or alternatively the computing device is representative of a plurality of different devices, such as multiple servers utilized by a business to perform operations "over the cloud" as described in FIG. 5.

The computing device 102 is illustrated as including an application 104 that includes a vectorized caricature avatar generation system 106. The application 104 performs any of various operations, such as processes and transforms digital content 108 (which is illustrated as maintained in storage 110 of the computing device 102), communicates with other computing devices via a network 112 (e.g., for video conferencing, for social media interaction), displays augmented reality or virtual reality user interfaces, and so forth. The application 104 includes a vectorized caricature avatar generation system 106 that generates and displays (or communicates over the network 112) a caricature of a user. An example caricature 114 of a user in a captured image 116 is illustrated as displayed in a user interface 118 displayed by a display device 120. Although illustrated as being displayed, additionally or alternatively the UI is presented in other manners (e.g., audibly, haptically). The storage 110 is any of a variety of different types of storage, such as random access memory (RAM), Flash memory, solid state drive, magnetic disk drive, and so forth. Although illustrated as implemented locally at the computing device 102, additionally or alternatively functionality of the application 104, including the vectorized caricature avatar generation system 106, is implemented in whole or part via functionality available via the network 112, such as part of a web service or "in the cloud."

The computing device 102 also includes an operating system 122 that implements functionality to manage execution of application 104 as well as other applications on the computing device 102, to operate as an interface between the application 104 and hardware of the computing device 102, and so forth.

The vectorized caricature avatar generation system 106 implements functionality to generate vectorized caricature avatars from images of users. An example caricature 114 of a user in a captured image 116 is illustrated. The vectorized caricature avatar generation system 106 generates caricature avatars that are vector images rather than raster images, allowing various modifications to the caricature avatars to be made. For example, the caricature avatars are changeable to be smiling, frowning, eyes blinking, resized, and so forth.

Although a single application 104 is illustrated in FIG. 1, any number of applications are includable in the computing device 102. Any additional applications included in the computing device 102 optionally include a vectorized caricature avatar generation system 106 to generate caricature avatars. Additionally, although illustrated as being part of application 104, additionally or alternatively the vectorized caricature avatar generation system 106 is implemented separately from the application 104, such as implemented as part of operating system 122, implemented as a separate application, and so forth.

In general, functionality, features, and concepts described in relation to the examples above and below are employable in the context of the example systems and procedures described herein. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combined in different ways. Thus, individual functionality, features, and concepts described in relation to different example environments, devices, components, figures, and procedures herein are usable in any suitable combinations and are not limited to the particular combinations represented by the enumerated examples in this description.

Vectorized Caricature Avatar Generation System Architecture

Figure 2:
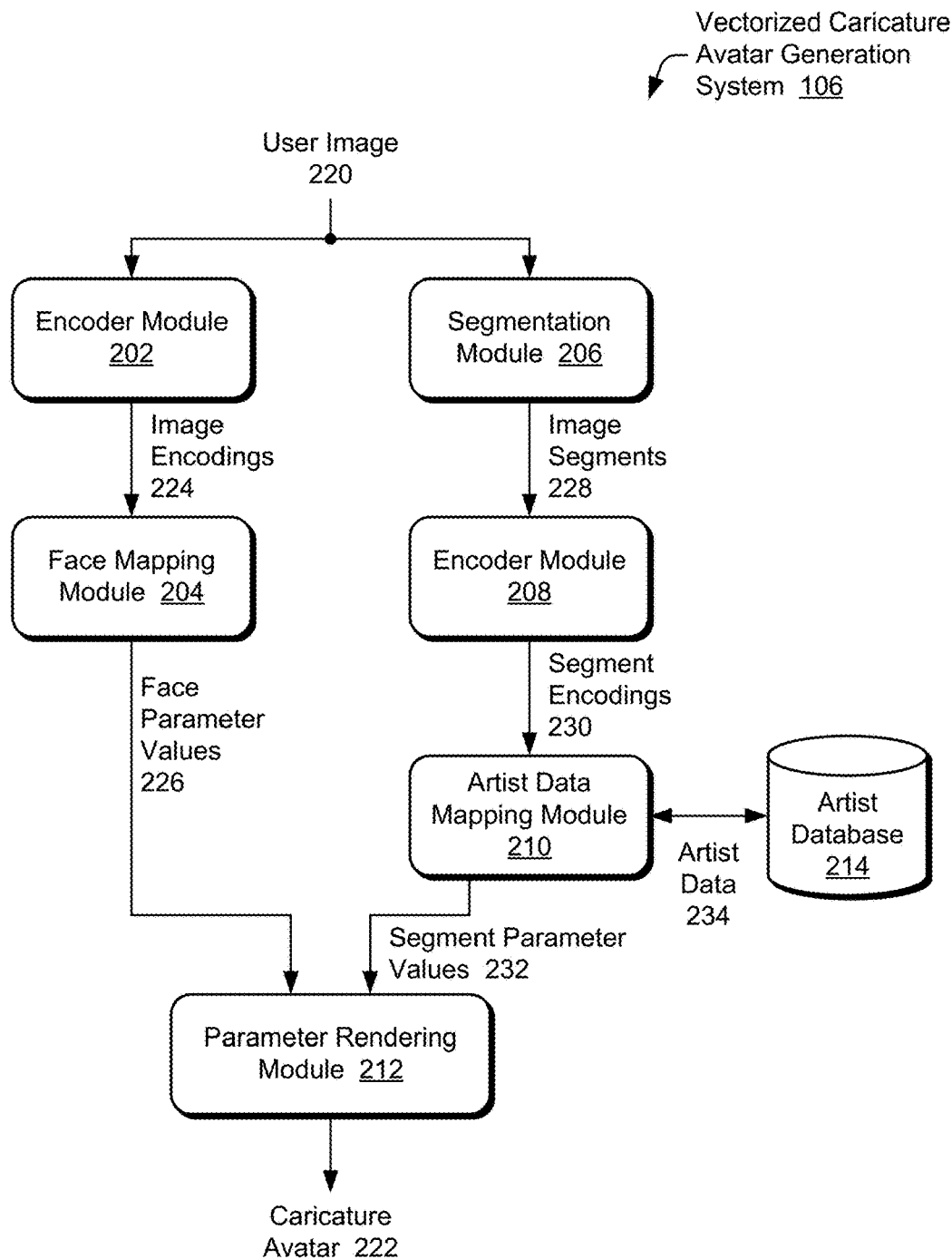
FIG. 2 is an illustration of an example architecture of a vectorized caricature avatar generation system.

FIG. 2 is an illustration of an example architecture of a vectorized caricature avatar generation system 106. The vectorized caricature avatar generation system 106 includes an encoder module 202, a face mapping module 204, a segmentation module 206, an encoder module 208, an artist data mapping module 210, a parameter rendering module 212, and an artist database 214.

Generally, the encoder module 202 receives a user image 220 from which face parameter values are generated by the face mapping module 204 and provided to the parameter rendering module 212. The user image 220 is also received by the segmentation module 206, which identifies segments of the user image 220 including certain facial features (e.g., hair, facial hair, eyeglasses). The artist data mapping module 210 determines, and provides to the parameter rendering module 212, segment parameter values that are parameter values from the artist database 214 that correspond to the segments of the user image 220. The parameter rendering module 212 uses the face parameter values and the segment parameter values to generate a caricature avatar 222 of the user in the user image 220.

More specifically, the encoder module 202 implements functionality to generate image encodings 224 from the user image 220. To generate the image encodings 224, the encoder module 202 identifies dense key points from the user image 220. The dense key points are a representation of the geometry of the user (e.g., the face of the user) in the user image 220, the key points providing a mapping of the face of the user. In one or more implementations, the dense key points are a mapping of the entire face, e.g., indicating where each centimeter (or other granularity, such as every five millimeters) of the face is rather than only the location of particular facial features (e.g., the nose, the eyes, the mouth, etc.). The dense key points are generated using any of a variety of public or proprietary techniques. One technique for extracting the dense key points is "The official PyTorch implementation of Towards Fast, Accurate and Stable 3D Dense Face Alignment, ECCV 2020," found at https://github.com/cleardusk/3DDFA_V2.

The encoder module 202 also extracts the facial texture of the face of the user in the user image 220. In one or more implementations, the facial texture is extracted as a set of vectors that is a representation of the face. The set of vectors are generated using any of a variety of public or proprietary techniques, such as ArcFace (Additive Angular Margin Loss).

The dense key points and the facial texture (e.g., the set of vectors) are output by the encoder module 202 as the image encodings 224. In one or more implementations, the encoder module 202 generates the image encodings 224 for only a portion of the face of the user. For example, certain portions of the user image 220 are identified by the segmentation module 206 as discussed in more detail below. The dense key points and the facial texture for the portions of the user image 220 identified by the segmentation module 206 need not be provided to the parameter rendering module 212 as part of the face parameter values 226.

The face mapping module 204 receives and uses the image encodings 224 to generate face parameter values 226 for the face in the user image 220. The face parameters are different aspects or characteristics of the face of a user that are considered useful in generating a caricature avatar (e.g., considered useful by a designer or developer of the vectorized caricature avatar generation system 106, by an artist generating caricature avatars for the artist database 214, and so forth). The values of the face parameters are altered to alter the appearance of the caricature avatar.

In one or more implementations, the face parameters include the location of the outline of the face (e.g., the head) of the user, such as multiple (e.g., approximately 12) points (e.g., x-y locations in a 2-dimensional (2D) plane) along the outline of the user's face. Additionally or alternatively, the face parameters include parameters regarding skin color, such as a base skin color, shade strength for colors in areas of the face that are shaded, highlight strength for colors in areas of the face that are highlighted, and so forth. Additionally or alternatively, the face parameters include outline shadow parameters, such as parameters indicating an amount of shadow (e.g., a line width) at multiple (e.g., approximately 12) points (e.g., x-y locations in a 2D plane) along the outline of the user's face.

Additionally or alternatively, the face parameters include nose parameters, such as the size of the nose, the position of the nose (e.g., multiple (such as approximately 9) points (e.g., x-y locations in a 2D plane) along the outside of the nose), the width of the nose, and so forth. Additionally or alternatively, the face parameters include eyebrow parameters, such as the position of the eyebrows (e.g., multiple (such as approximately 4) points (e.g., x-y locations in a 2D plane) along the outsides of the eyebrows), eyebrow color, eyebrow volume, eyebrow length, eyebrow hair spread, eyebrow curve, and so forth. Additionally or alternatively, the face parameters include pupil parameters, such as pupil color, pupil position (e.g., an x-y location in a 2D plane of the center of the pupil), pupil size, and so forth.

Additionally or alternatively, the face parameters include eye parameters, such as the size of the eyes, the angle of the eyes, and so forth. Additionally or alternatively, the face parameters include eye position parameters, such as the position of the eyes (e.g., multiple (such as approximately 7) points (e.g., x-y locations in a 2D plane) along the outside of the eyes), wrinkle by the eyes (e.g., width of four or five wrinkle lines), presence of false eyelashes or bottom eyelashes, whether lines associated with the eyelid move when the eyelid moves, and so forth.

Additionally or alternatively, the face parameters include eyeshadow parameters, such as eyeshadow color, eyeshadow location (e.g., multiple (such as approximately 6) points (e.g., x-y locations in a 2D plane) along the outside of the eyeshadow or the center of the eyeshadow), and so forth. Additionally or alternatively, the face parameters include nose shadow parameters, such as nose shadow location (e.g., multiple (such as approximately 5) points (e.g., x-y locations in a 2D plane) along the outside of the nose shadow), shadow width, shadow length, and so forth.

Additionally or alternatively, the face parameters include lip parameters, such as lip color, lip size, and so forth. Additionally or alternatively, the face parameters include mouth parameters such as mouth size, mouth location, mouth angle, (e.g., multiple (such as approximately 15) points (e.g., x-y locations in a 2D plane) along the outside of the lips when the mouth is open), mouth edge size, mouth edge location, mouth shadow size, and so forth. Additionally or alternatively, the face parameters include teeth parameters such as top teeth size, top teeth location, bottom teeth size, bottom teeth location, and so forth.

Additionally or alternatively, the face parameters include ear parameters, such as whether to show ears, ear size, ear angles, ear locations (e.g., multiple (such as approximately 3) points (e.g., x-y locations in a 2D plane) along the outside of the ears), and so forth. Additionally or alternatively, the face parameters include wrinkle parameters, such as, for each of multiple (e.g., 6) wrinkles, the width of the wrinkle, the location of the wrinkle (e.g., multiple (such as approximately 4) points (e.g., x-y locations in a 2D plane) along the outside of the wrinkle), and so forth.

Additionally or alternatively, the face parameters include highlight parameters, such as forehead highlight location and size, nose highlight location and size, cheek highlight location and size, and so forth. Additionally or alternatively, the face parameters include back hair (along the back of the user's head) parameters, such as hair color, hair length, hair break point, hair bottom volume, hair zig zag size, hair location (e.g., multiple (such as approximately 21) points (e.g., x-y locations in a 2D plane) along the outside of the hair), and so forth.

Additionally or alternatively, the face parameters include front hair line (along the forehead or top of the user's head) parameters, such as whether a hair line is present, hair line location (e.g., multiple (such as approximately 7) points (e.g., x-y locations in a 2D plane) along the hair line), whether side fur is present, volume of front fur, length of front fur, spread of front fur, and so forth. Additionally or alternatively, the face parameters include front hair parameters (e.g., hair over the user's forehead), such as front hair location (e.g., multiple (such as approximately 18) points (e.g., x-y locations in a 2D plane) along the outside of the front hair), parameters for different portions (e.g., approximately 5) of the front hair such as different waves or curls of different portions of the front hair (e.g., for each portion front hair width, front hair length, front hair angle, front hair location, front hair curve or wave size), and so forth.

Additionally or alternatively, the face parameters include mustache parameters, such as mustache color, mustache darkness, mustache width, mustache location (e.g., multiple (such as approximately 4) points (e.g., x-y locations in a 2D plane) along the outside of the mustache), mustache fur volume, mustache fur length, mustache fur length ratio, mustache fur spread, mustache fur curl, mustache fur thickness, and so forth. Additionally or alternatively, the face parameters include beard parameters, such as beard color, beard darkness, beard width, beard location (e.g., multiple (such as approximately 3) points (e.g., x-y locations in a 2D plane) along the outside of the beard), beard fur volume, beard fur length, beard fur length ratio, beard fur spread, beard fur curl, beard fur thickness, beard wave, parameters for the beard along the bottom of the mouth (e.g., beard fur volume, beard width, beard fur length, beard fur length ratio, beard fur spread, beard fur curl), and so forth.

Additionally or alternatively, the face parameters include eyeglasses parameters, such as whether eyeglass are worn (are present), side frame color and width, center frame color and width, top frame color and width, bottom frame color and width, eyeglasses location (e.g., multiple (such as approximately 12) points (e.g., x-y locations in a 2D plane) along the frame of the eyeglasses), and so forth.

In one or more implementations, the face mapping module 204 includes a machine learning system. Machine learning systems refer to a computer representation that is tuned (e.g., trained) based on inputs to approximate unknown functions. In particular, machine learning systems are systems that utilize algorithms to learn from, and make predictions on, known data by analyzing the known data to learn to generate outputs that reflect patterns and attributes of the known data. For instance, machine learning systems include decision trees, support vector machines, linear regression, logistic regression, Bayesian networks, random forest learning, dimensionality reduction algorithms, boosting algorithms, artificial neural networks, deep learning, and so forth.

In one or more implementations, the face mapping module 204 includes a machine learning system that is a multi-layer perceptron. A multi-layer perceptron is a regression machine learning system formed from multiple layers of nodes (i.e., neurons) and includes various layers such as an input layer, an output layer, and one or more hidden layers such as summation layers, activation layers, and so forth.

The machine learning system is trained using training data that includes multiple user images and corresponding known face parameter values for the user images. The facial texture (e.g., a set of vectors) is generated for each user image in the same manner as performed by the encoder module 202. The machine learning system is trained, for example, by updating weights or values of the hidden layers to minimize the loss (e.g., mean squared error loss) between known face parameter values for users in the user images and the face parameter values generated by the machine learning system for the users in the user images.

The known face parameter values are generated, for example, manually by an artist generating caricature avatars for the users in the training data user images. As an example, a user interface of a procedural caricature generator is displayed to an artist allowing the artist to provide input changing any of the face parameter values for a user image of the training data. In response to a change in a face parameter value, the procedural caricature generator generates and displays a caricature avatar based on the changed parameter values allowing the artist to repeatedly alter face parameter values until he or she is happy with the resultant caricature avatar. The procedural caricature generator generates the caricature avatar in the same manners as parameter rendering module 212 as discussed in more detail below.

It should be noted that a relatively small number of face parameters are associated with each user image (e.g., on the order of a few hundred or several hundred). This allows the machine learning system to be trained faster and using a smaller amount of training data than techniques that are analyzing pixels of the user images (e.g., hundreds of thousands of pixels or more). Accordingly, the machine learning system is trained using, for example, 200 to 300 training user images and corresponding known face parameter values.

The segmentation module 206 implements functionality to extract image segments 228 from the user image 220. The image segments 228 are portions of the user image 220 that include certain facial features. In one or more implementations, the image segments 228 are portions of the user image 220 that include one or more of hair, facial hair (e.g., mustache or beard), and eyeglass features. Additionally or alternatively, the image segments 228 include portions of the user image 220 that include other features, such as piercings, hats, and so forth. The segmentation module 206 generates an image segment 228 for each such feature included in the user image 220. The image segments 228 are generated using any of a variety of public or proprietary techniques, such as one or more machine learning systems trained to detect or extract particular facial features (e.g., one machine learning system trained to extract hair and eyeglasses and a second machine learning system trained to extract facial hair). Examples of such machine learning systems are "MobileNets: Efficient Convolutional Neural Networks for Mobile Vision Applications," by Andrew G. Howard, Menglong Zhu, Bo Chen, Dmitry Kalenichenko, Weijun Wang, Tobias Weyand, Marco Andreetto, Hartwig Adam, arXiv: 1704.04861 (Apr. 17, 2017) and "OpenPose: Realtime Multi-Person 2D Pose Estimation using Part Affinity Fields," by Zhe Cao, Gines Hidalgo, Tomas Simon, Shih-En Wei, Yaser Sheikh, arXiv:1812.08008 (May 30, 2019).

In one or more implementations, prior to generating the image segments 228 the segmentation module 206 crops the user image 220 to include only the face of the user (along with any facial features, such as hair, eyeglasses, and so forth). Additionally or alternatively, the segmentation module 206 normalizes the user image 220 (e.g., the entire user image 220, the cropped user image, the image segments 228, etc.). This normalization accounts, for example, for different brightness or exposure levels in different user images.

The encoder module 208 extracts, and outputs as the segment encodings 230, the facial texture of each of the image segments 228. In one or more implementations, the facial texture is extracted as a set of vectors that is a representation of the face. The set of vectors are generated using any of a variety of public or proprietary techniques, such as ArcFace (Additive Angular Margin Loss). The facial texture is extracted by the encoder module 208 in, for example, the same manner as is done by the encoder module 202, although the encoder module 208 need extract the facial texture only for the image segments 228.

The facial texture (e.g., the set of vectors) are output by the encoder module 208 as the segment encodings 230. The artist data mapping module 210 receives and uses the segment encodings 230 to generate segment parameter values 232 for the image segments 228 based on artist data 234 included in the artist database 214. The segment parameter values 232 are generated, for example, based on a machine learning system. The artist database 214 includes caricature avatar parameter values generated, for example, manually by an artist generating caricature avatars for the users in the user images. The caricature avatars generated manually include various different types of hair features, such as different lengths of hair, different types of hair (e.g., curly or straight), no hair (e.g., bald), and so forth.

In one or more implementations, the artist data mapping module 210 includes a machine learning system that is a multi-layer perceptron. The machine learning system is trained using training data that includes image segments from user images and corresponding known face parameter values for the image segments. The known face parameter values for the image segments are generated, for example, manually by an artist generating caricature avatars for the users in the user images.

Figure 3:
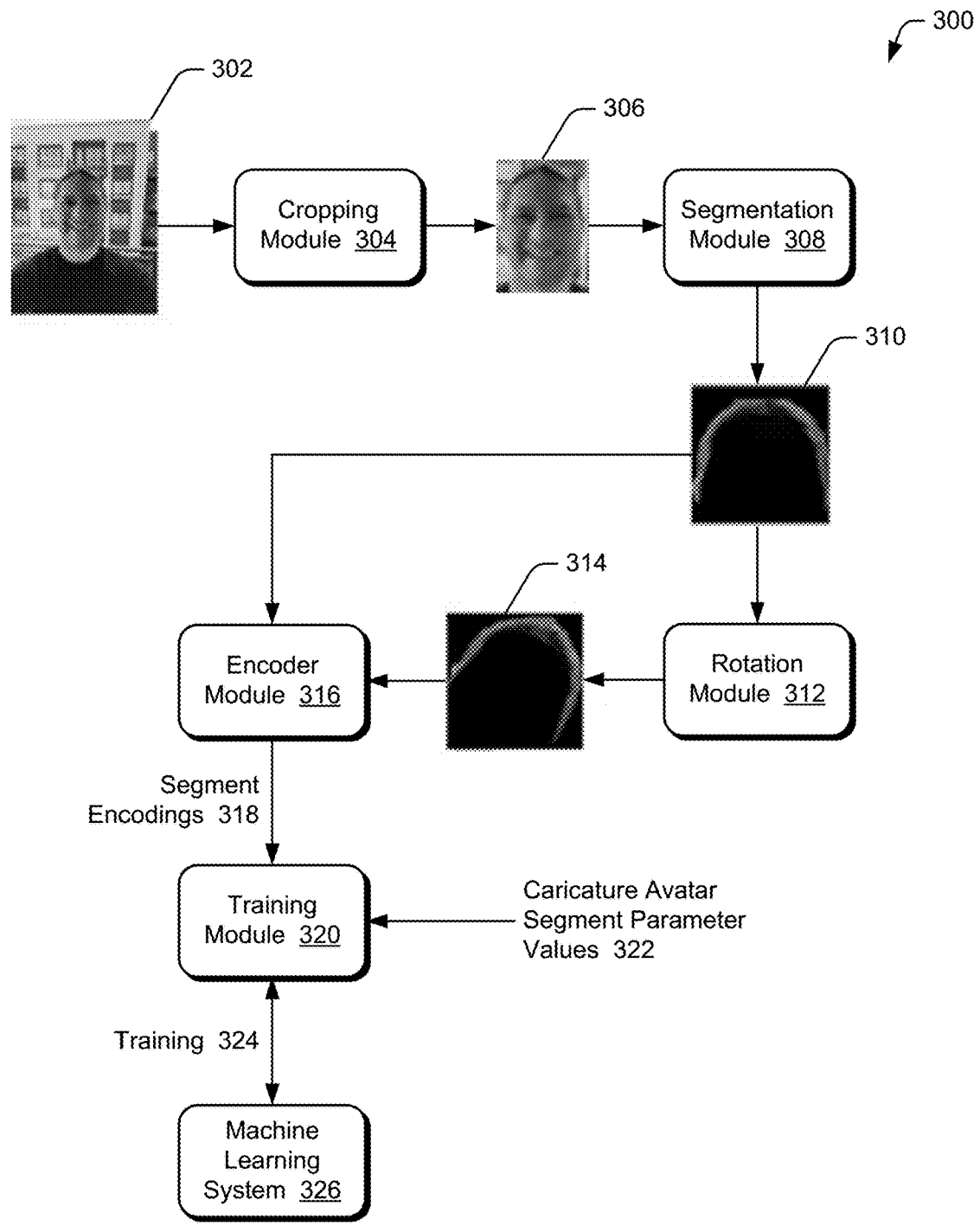
FIG. 3 illustrates an example of training a machine learning system.

FIG. 3 illustrates an example 300 of training the machine learning system of the artist data mapping module 210. The example 300 illustrates training data including a single user image 302 for ease of explanation. It is to be appreciated that the training data includes multiple user images (e.g., 200 to 300 or more user images). The example 300 also illustrates an example of training a machine learning system for a facial feature of hair. It is to be appreciated that machine learning systems for other facial features (e.g., facial hair, eyeglasses, etc.) are trained in an analogous manner.

A cropping module 304 generates a cropped user image 306 from the user image 302. The cropping module 304 crops the user image 306 to include the face of the user in the user image 302. The cropping module 304 crops the user image 302 using any of a variety of public or proprietary techniques. In one or more implementations, the cropping module 304 crops the user image 302 by using any of a variety of public or proprietary techniques to identify the face in the user image 302 and selects a smallest rectangular bounding box that includes the face in the user image 302.

A segmentation module 308 extracts a hair image segment 310 from the user image 220. The image segment 310 is, for example, a bitmap indicating locations in the cropped user image 306 where hair is present. This hair refers to hair on the top of the head of the user as well as along the sides and back of the head of the user. This hair is, for example, hair that is above or behind the ears of the user in contrast to facial hair (e.g., beards and mustaches). In one or more implementations, the segmentation module 308 extracts the image segment 310 in the same manner as the segmentation module 206 discussed above.

A rotation module 312 generates a rotated versions of the hair image segment 310, illustrated as rotated hair image segment 314. Although a single rotated hair image segment 314 is illustrated, the rotation module 312 optionally generates any number of rotated versions of the hair segment 310. The amount of rotation of the hair image segment varies, and optionally varies for different users or different rotated hair image segments for the same user. In one or more implementations, the amount of rotation varies to accommodate expected amounts that users tilt their heads when capturing images (e.g., taking selfies) for use in generating a caricature avatar. In an example, the amount of rotation varies plus or minus 30 degrees from vertical. Generating rotated versions of the hair image segments allows those rotated versions to be used in training the machine learning system so that the machine learning system is trained to accurately generate parameter values for facial features of users despite differences in the angles of their heads when capturing the user image from which the caricature avatar is generated.

An encoder module 316 receives, and generates segment encodings 318 from, the hair image segment 310 and the rotated hair image segment 314. The encoder module 316 generates an encoding for each of the hair image segment 310 and each rotated hair image segment 314. The segment encodings 318 extract the facial texture of each of the hair image segment 310 and the rotated hair image segment 314. In one or more implementations, the facial texture for each hair image segment 310 and rotated hair image segment 314 is extracted as a set of vectors that is a representation of the corresponding image segment (e.g., a set of vectors generated using ArcFace (Additive Angular Margin Loss)). The facial texture is extracted by the encoder module 316 in, for example, the same manner as is done by the encoder module 208.

A training module 320 receives the segment encodings 318 as well as caricature avatar segment parameter values 322. The caricature avatar segment parameter values 322 are parameter values generated, for example, manually by an artist generating caricature avatars for the users in the user images. The caricature avatars generated manually include various different types of hair features, such as different lengths of hair, different types of hair (e.g., curly or straight), no hair (e.g., bald), and so forth. The caricature avatar segment parameter values 322 are the parameter values for the segments of the caricature avatars and are used as known face parameter values by the training module 320.

The training module 320 trains 324 a machine learning system 326 using training data that includes the segment encodings 318 and the caricature avatar segment parameter values 322. In one or more implementations the machine learning system 326 is a multi-layer perceptron. The training module 320 uses as training data each of the segment encodings 318. The known parameter values for each segment encoding 318 are the caricature avatar segment parameter values for the caricature avatar corresponding to the segment encoding 318 (the caricature avatar generated from the user image from which the segment encoding 318 was extracted). The training module 320 trains 324 the machine learning system 326, for example, by updating weights or values of the hidden layers to minimize the loss (e.g., mean squared error loss) between the face parameter values generated by the machine learning system 326 from the segment encodings 318 and the corresponding known caricature avatar segment parameter values 322.

In one or more implementations, the training module 320 masks certain values in the segment encodings 318 and the caricature avatar segment parameter values 322 during training. Masking the values refers to not using the values during training so that weights or values of hidden layers in the machine learning system 326 are not updated based on the masked values. The training module 320 masks values that would be counterproductive to training the machine learning system 326.

In one or more implementations, the training module 320 masks default values in the caricature avatar segment parameter values 322. In generating the caricature avatars manually, an artist creates a caricature avatar for each of the user images in the training data based on base or default parameter values. The artist adjusts various parameter values to create different styles, such as large eyes vs small eyes, large mouth vs small mouth, darker skin vs lighter skin, and so forth. A record of which parameter values were or were not changed is provided to the training module 320. For training the machine learning system 326, for a particular segment encoding, the training module 320 provides only the parameter values of the corresponding caricature avatar segment parameter values 322 that were not changed to the machine learning system 326, and similarly provides to the machine learning system 326 only the parameter values of the segment encoding 318 for the parameters for which the caricature avatar segment parameter values 322 were not changed.

By masking default values in the caricature avatar segment parameter values 322 the machine learning system 326 is trained based on parameter values that were changed by the artist rather than parameter values that were not changed by the artist. Thus, the machine learning system 326 regresses to parameter values that have been modified by the artist rather than to the default parameter values.

It should be noted that a relatively small number of face parameters are associated with each user image (e.g., on the order of a few hundred or several hundred). This allows the machine learning system 326 to be trained faster and using a smaller amount of training data than techniques that are analyzing pixels of the user images (e.g., hundreds of thousands of pixels or more). Accordingly, the machine learning system is trained using, for example, 200 to 300 training user images and corresponding known face parameter values.

Returning to FIG. 2, the artist data mapping module 210 receives the segment encodings 230 and generates segment parameter values for the segment encodings 230. These segment parameter values are generated based on the segment encodings 230 using a machine learning system, such as machine learning system 326 of FIG. 3. These segment parameter values are also referred to as intermediary segment parameter values or internal segment parameter values because they are not output as segment parameter values 232. Rather, the artist data mapping module 210 compares the intermediary segment parameter values to the caricature avatar segment parameter values obtained as artist data 234 from the artist database 214. The artist data mapping module 210 identifies the caricature avatar segment parameter values that are most similar to (e.g., closest to) the intermediary segment parameter values. In one or more implementations, the artist data mapping module 210 determines the similarity of the intermediary segment parameter values to each of the caricature avatar segment parameter values by determining the distance (e.g., cosine distance) between the intermediary segment parameter values and each of the caricature avatar segment parameter values. The artist data mapping module 210 selects the caricature avatar segment parameter values having the smallest distance to the intermediary segment parameter values and outputs the selected caricature avatar segment parameter values as the segment parameter values 232.

Selecting caricature avatar segment parameter values from the artist data 234 rather than the intermediary segment parameter values allows the machine learning system of the artist data mapping module 210 to be trained more quickly and with less training data (e.g., on the order of 200 to 300 training user images). One reason for this is that facial features such as hair, facial hair, and eyeglasses do not always exist on a user's face, and when they do exist it is oftentimes difficult to train a machine learning system to generate parameter values for the facial features because of the wide variety of these facial features across users. Accordingly, training a machine learning system to generate the facial features uses a significantly larger amount of training data. In contrast, the techniques discussed herein find the segment parameter values for already generated caricature avatars that are closest to the intermediary segment parameter values, allowing segment parameter values to be selected that are close enough for representing the facial features of the user.

The parameter rendering module 212 receives, and generates a caricature avatar 222 from, the face parameter values 226 and the segment parameter values 232. The parameter rendering module 212 generates the caricature avatar 222 from the face parameter values 226 and the segment parameter values 232 using any of a variety of public or proprietary caricature avatar generation techniques.

In one or more implementations, the parameter rendering module 212 determines the outline of the face and various portions of the face (e.g., eyes, nose, wrinkles) from the face parameter values 226. Using the location and size values for the various portions included in the face parameter values 226, for some portions of the face (e.g., areas such as pupils, eyes, nose, lips) the parameter rendering module 212 includes in the caricature avatar 222 the appropriate outline of the portion and color within the outline. For other portions (e.g., wrinkles or lines), using the location and size values for those portions the parameter rendering module 212 includes in the caricature avatar 222 the appropriate lines.

Similarly, the parameter rendering module 212 also determines the parameter values for certain facial features (e.g., eyeglasses, hair, facial hair) from the segment parameter values 232. The parameter rendering module 212 analogously includes the appropriate lines and colors to the caricature avatar 222, except that the parameter values are included in segment parameter values 232 rather than face parameter values 226.

The lines included in the caricature avatar 222 are identified by vectors. Lines are oftentimes defined based on multiple points with a vector from one point to another. In one or more implementations, to identify the vector from one point to another, the parameter rendering module 212 uses any of a variety of public or proprietary techniques to identify a smooth curve between the points.

These vectors from which the lines included in the caricature avatar 222 are generated are based on the points included in the face parameter values 226 and the segment parameter values 232. In one or more implementations, the parameter rendering module 212 uses the dense key points in the image encodings 224 to further smooth the vectors between two location points (points included in the face parameter values and the segment parameter values), resulting in a caricature avatar 222 that tracks the face of the user more accurately. The parameter rendering module 212 identifies the dense feature points between location two points (e.g., those that are along the vector between the two location points or within a threshold distance of the two location points, such as within 3 pixels) and connects those dense feature points with straight lines. Given the large number of dense feature points, the resultant line between two location points appears to be a smooth curve. This resultant line (e.g., the collection of vectors identifying the line between the two location points) is used as the vector between the two location points.

The parameter rendering module 212 saves the caricature avatar 222 in any of a variety of different formats for subsequent rendering on a computing device. For example, in some situations the parameter rendering module 212 saves the caricature avatar 222 as an Adobe® Photoshop® image editing application file (e.g., a PSD file).

In one or more implementations, the parameter rendering module 212 includes post-processing functionality that allows a user of the vectorized caricature avatar generation system 106 to generate multiple different versions of the caricature avatar each having different parameter values. The user is thus able to provide inputs to allow the user to change the caricature avatar. For example, user input indicating that an eyes open/closed parameter value is to be changed from "open" to "closed", or an eye size parameter value is to be changed from 50 to 0, is received to change the eyes of the user in the caricature avatar from being open to being closed. By way of another example, user input indicating that mouth location parameter values are to be changed are received to change the user in the caricature avatar from not smiling to smiling.

In response to user input changing any of the face parameter values 226 or segment parameter values 232, the parameter rendering module 212 simply generates a new caricature avatar 222 based on the changed parameter values. Time and resources (e.g., processing power, memory, power) need not be expended for any machine learning systems to generate new values. In one or more implementations, each different version of a caricature avatar for a user is stored as a separate layer in a PSD file.

Each of the caricature avatars resulting from such changes is saved by the vectorized caricature avatar generation system 106, resulting in multiple different versions of the caricature avatar 222 for the user. This allows animated caricature avatars to be displayed for the user, such as alternating between a caricature avatar with the user's eyes open and a caricature avatar with the user's eyes closed to animate the caricature avatar to appear to be blinking. Any of a variety of computer animation techniques or programs are usable to animate the caricature avatar based on the multiple different versions of the caricature avatar 222, such as the Adobe® Animate computer animation application.

In one or more implementations, the post-processing functionality of parameter rendering module 212 allows a user of the vectorized caricature avatar generation system 106 to generate multiple different versions of the caricature avatar having different styles. For example, different versions of the caricature avatar having big eyes or small eyes, squarish faces or roundish faces, and so forth. Various different filters are generated (e.g., by a developer or designer of the vectorized caricature avatar generation system 106) and applied that alter one or more parameter values for a caricature avatar to achieve these different versions. Accordingly, rather than the user providing input to manually change multiple different parameter values, user input selecting one of multiple different styles causes the parameter rendering module 212 to quickly and easily generate a version of the caricature avatar in accordance with the selected style.

It should be noted that the caricature avatar 222 is vectorized, referring to the caricature avatar 222 being a vector graphic rather than a raster image. Accordingly, the caricature avatar 222 various changes to the caricature avatar 222, such as increasing or decreasing the size of the caricature avatar 222, are readily made by simply re-drawing or re-rendering the caricature avatar 222, resulting in a caricature avatar without artifacts found in raster images.

Example Procedures

The following discussion describes techniques that are implemented utilizing the previously described systems and devices. Aspects of the procedure are implemented in hardware, firmware, software, or a combination thereof. The procedure is shown as a set of blocks that specify operations performed by one or more devices and are not necessarily limited to the orders shown for performing the operations by the respective blocks. Furthermore, although various operations performed by one or more devices are recited, the techniques discussed herein additionally or alternatively include additional operations. In portions of the following discussion, reference is made to FIGS. 1-4.

Figure 4:
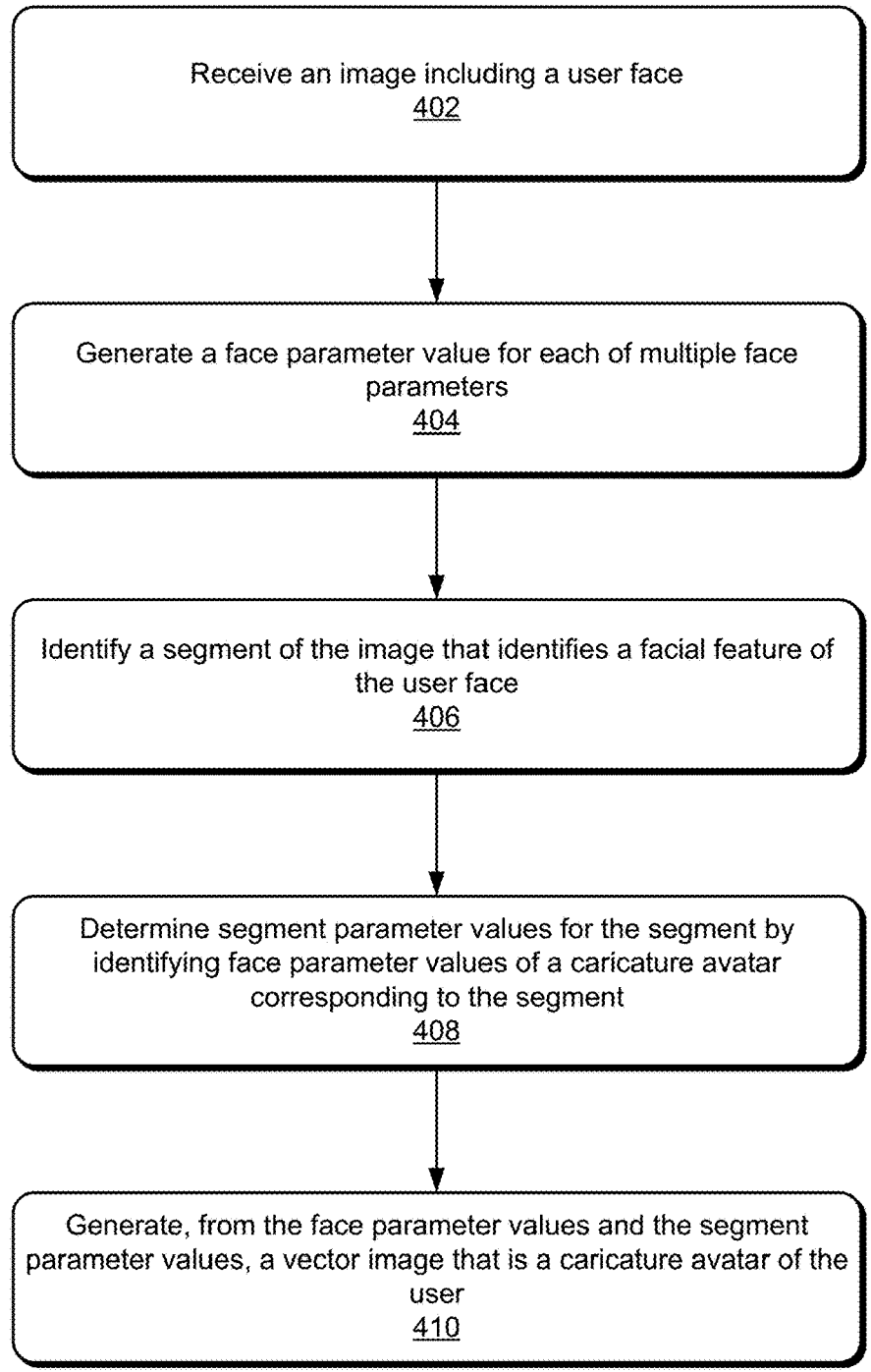
FIG. 4 is a flow diagram depicting a procedure in an example implementation of a vectorized caricature avatar generator.

FIG. 4 is a flow diagram 400 depicting a procedure in an example implementation of a vectorized caricature avatar generator. In this example, an image including a user face is received (block 402). The image is, for example, a selfie captured by the user.

A face parameter value is generated for each of multiple face parameters (block 404). These face parameter values are generated based on the user face, and are aspects or characteristics of the face of a user that are considered useful in generating a caricature avatar.

A segment of the image that identifies a facial feature of the user face is identified (block 406). The facial feature is, for example, hair, facial hair, or eyeglasses.

Segment parameter values for the segment of the image are identified (block 408). The segment parameter values are identified by identifying face parameter values of a caricature avatar corresponding to the segment of the image.

A vector image that is a caricature avatar of the user is generated from the face parameter values and the segment parameter values (block 410). The vector image is displayed, stored, communicated to another device, and so forth.

Example System and Device

Figure 5:
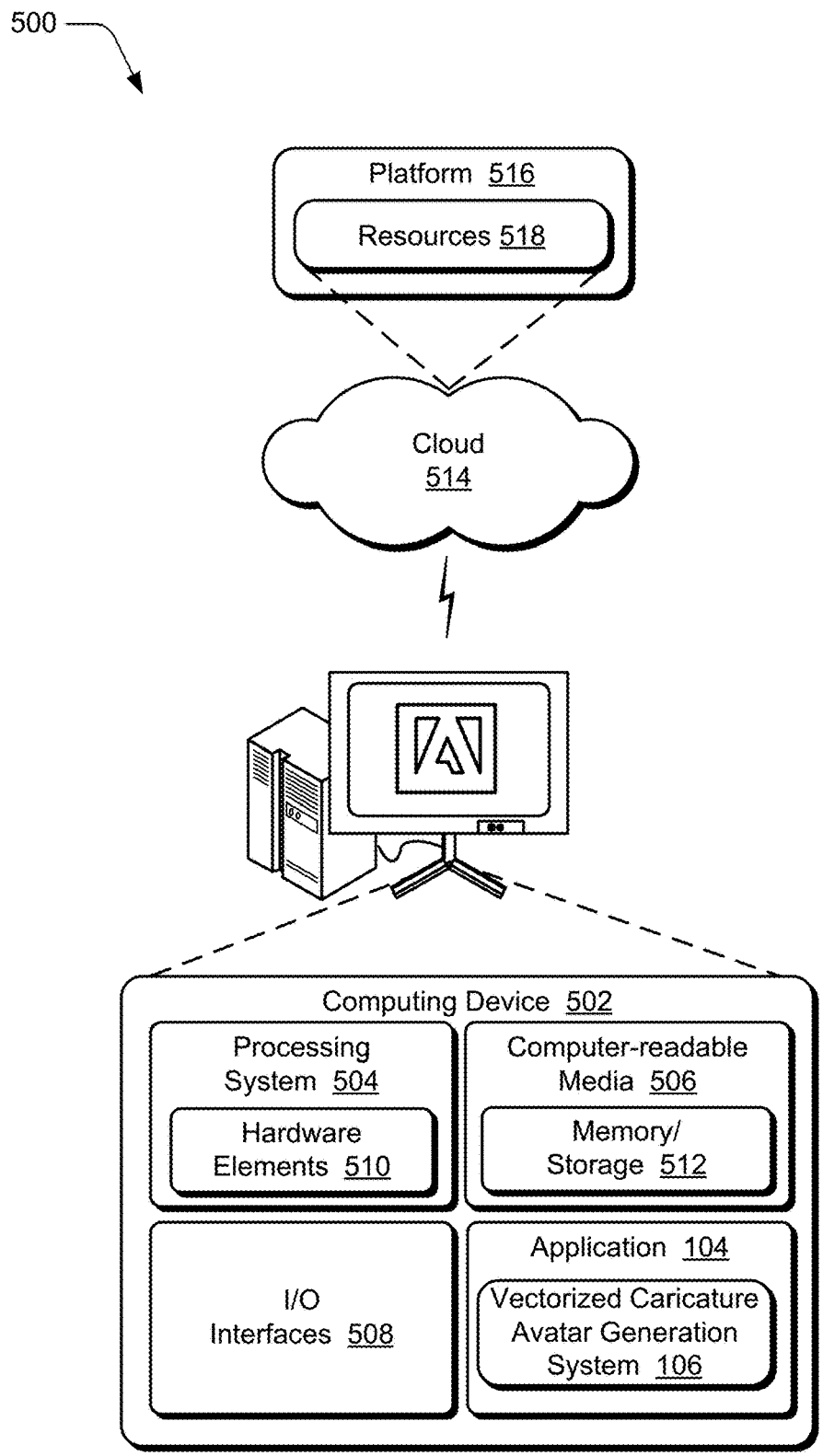
FIG. 5 illustrates an example system including various components of an example device that is implemented as any type of computing device as described and/or utilized with reference to FIGS. 1-4 to implement aspects of the techniques described herein.

FIG. 5 illustrates an example system generally at 500 that includes an example computing device 502 that is representative of one or more computing systems and/or devices that implement the various techniques described herein. This is illustrated through inclusion of the application 104 with the vectorized caricature avatar generation system 106. The computing device 502 is, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O interface 508 that are communicatively coupled, one to another. Although not shown, in one or more implementations the computing device 502 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware element 510 that are configured, for example, as processors, functional blocks, and so forth. The processing system 504 is optionally implemented in hardware as an application specific integrated circuit or other logic device formed using one or more semiconductors. The hardware elements 510 are not limited by the materials from which they are formed, or the processing mechanisms employed therein. For example, in one or more implementations processors are comprised of semiconductor(s) and/or transistors (e.g., electronic integrated circuits (ICs)). In such a context, processor-executable instructions include electronically-executable instructions.

The computer-readable storage media 506 is illustrated as including memory/storage 512. The memory/storage 512 represents memory/storage capacity associated with one or more computer-readable media. The memory/storage component 512 represents memory/storage capacity associated with one or more computer-readable media. The memory/storage component 512 includes one or both of volatile media (such as random access memory (RAM)) and non-volatile media (such as read only memory (ROM), Flash memory, optical disks, magnetic disks, and so forth). The memory/storage component 512 includes one or both of fixed media (e.g., RAM, ROM, a fixed hard drive, and so on) and removable media (e.g., Flash memory, a removable hard drive, an optical disc, and so forth). The computer-readable media 506 is optionally configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 502 is configured in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

An implementation of the described modules and techniques is optionally stored on or transmitted across some form of computer-readable media. The computer-readable media includes any of a variety of media that is accessible by the computing device 502. By way of example, and not limitation, computer-readable media includes "computer-readable storage media" and "computer-readable signal media."

"Computer-readable storage media" refers to media and/or devices that enable persistent and/or non-transitory storage of information thereon in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which is accessed by a computer.

"Computer-readable signal media" refers to a signal-bearing medium that is configured to transmit instructions to the hardware of the computing device 502, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of modules, programmable device logic and/or fixed device logic implemented in a hardware form that are employed in some implementations to implement at least some aspects of the techniques described herein, such as to perform one or more instructions. Hardware includes, for example, components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are optionally employed to implement various techniques described herein. Accordingly, in one or more implementations software, hardware, or executable modules are implemented as one or more instructions and/or logic embodied on some form of computer-readable storage media and/or by one or more hardware elements 510. The computing device 502 is configured to implement particular instructions and/or functions corresponding to the software and/or hardware modules. Accordingly, implementation of a module that is executable by the computing device 502 as software is achievable at least partially in hardware, e.g., through use of computer-readable storage media and/or hardware elements 510 of the processing system 504. The instructions and/or functions executable/operable by one or more articles of manufacture (for example, one or more computing devices 502 and/or processing systems 504) to implement techniques, modules, and examples described herein.

The techniques described herein are supported by various configurations of the computing device 502 and are not limited to the specific examples of the techniques described herein. Additionally or alternatively, this functionality is implemented all or in part through use of a distributed system, such as over a "cloud" 514 via a platform 516 as described below.

The cloud 514 includes and/or is representative of a platform 516 for resources 518. The platform 516 abstracts underlying functionality of hardware (e.g., servers) and software resources of the cloud 514. The resources 518 include applications and/or data utilizable while computer processing is executed on servers that are remote from the computing device 502. Resources 518 optionally include services provided over the Internet and/or through a subscriber network, such as a cellular or Wi-Fi network.

The platform 516 abstract resources and functions to connect the computing device 502 with other computing devices. The platform 516 also optionally serves to abstract scaling of resources to provide a corresponding level of scale to encountered demand for the resources 518 that are implemented via the platform 516. Accordingly, in an interconnected device embodiment, implementation of functionality described herein is distributed throughout the system 500. For example, the functionality is implemented in part on the computing device 502 as well as via the platform 516 that abstracts the functionality of the cloud 514.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment, a method implemented by at least one computing device, the method comprising:
   receiving an image including a user face;
   identifying a segment of the image that identifies a facial feature of the user face;
   generating, for each of multiple face parameters, a face parameter value by processing a first portion of the user face that excludes the facial feature using a first machine learning system;
   determining segment parameter values for the segment of the image by processing a second portion of the user face that includes the facial feature and excludes the first portion of the user face using a second machine learning system that is separately trained from the first machine learning system to determine the segment parameter values for the facial feature, the second machine learning system trained using training data that includes corresponding segments of multiple user images that identify the facial feature in the multiple user images and known segment parameter values for the corresponding segments of caricature avatars corresponding to the multiple user images, the second machine learning system having been trained using the known segment parameter values that are changed from default values during manual generation of the caricature avatars while masking the known segment parameter values that are unchanged from the default values during the manual generation of the caricature avatars; and
   generating, from the face parameter values and the segment parameter values, a vector image that is a caricature avatar of a user depicted in the image.

2. The method of claim 1, wherein the generating the face parameter value includes generating the face parameter value using the first machine learning system trained using training data that includes a facial texture of each of the multiple user images and known face parameter values corresponding to each of the multiple user images.

3. The method of claim 2, the known face parameter values and the known segment parameter values having been generated manually by generating the caricature avatars for users depicted in the multiple user images.

4. The method of claim 2, further comprising training the first machine learning system by:
   receiving a user image of the multiple user images;
   generating the facial texture of the first portion of an additional user face depicted in the user image that excludes the facial feature;
   determining, using the first machine learning system, additional face parameter values of the user image based on the facial texture; and
   updating the first machine learning system based on a loss between the additional face parameter values and the known face parameter values of the user image.

5. The method of claim 1, the determining the segment parameter values including:
   identifying, using the second machine learning system, intermediary segment parameter values for the segment of the image;
   determining one of the caricature avatars having the known segment parameter values of a corresponding segment with a smallest difference to the intermediary segment parameter values of the segment of the image; and
   determining, as the segment parameter values, the known segment parameter values of the determined one of the caricature avatars.

6. The method of claim 1, wherein the training data includes a facial texture of the corresponding segments that identify the facial feature in the multiple user images and the known segment parameter values.

7. The method of claim 1, further comprising:
   receiving user input changing at least one of the face parameter values; and
   generating, from the face parameter values including the at least one changed face parameter value, a new caricature avatar of the user.

8. The method of claim 1, further comprising training the second machine learning system by:
   receiving a user image of the multiple user images;
   identifying a corresponding segment of the user image that identifies the facial feature;
   generating one or more rotated versions of the corresponding segment of the user image;
   generating, using the second machine learning system, additional segment parameter values from the one or more rotated versions of the corresponding segment; and
   updating the second machine learning system based on a loss between the additional segment parameter values generated from the one or more rotated versions of the corresponding segment and the known segment parameter values for the corresponding segment of the user image.

9. The method of claim 1, wherein the generating the face parameter value includes:
   identifying dense key points of the image representing a geometry of the user face;

extracting a facial texture of the user face that is a set of vectors representing the user face; and generating, for each of the multiple face parameters, the face parameter value based on the dense key points and the facial texture.

10. The method of claim 1, further comprising:

receiving user input changing at least one of the segment parameter values; and generating, from the segment parameters including the at least one changed segment parameter value, a new caricature avatar of the user.

11. The method of claim 1, further comprising training the second machine learning system by:

receiving a user image of the multiple user images;

generating a facial texture of a corresponding segment of the user image that identifies the facial feature;

determining, using the second machine learning system, additional segment parameter values of the corresponding segment based on the facial texture; and updating the second machine learning system based on a loss between the additional segment parameter values and the known segment parameter values for the corresponding segment of the user image.

12. The method of claim 1, wherein the facial feature is hair, facial hair, or eyeglasses.

13. In a digital medium environment, a computing device comprising:

a processor; and computer-readable storage media having stored thereon multiple instructions of an application that, responsive to execution by the processor, cause the processor to:

receive an image including a user face;

identify a segment of the image that identifies a facial feature of the user face;

generate, for each of multiple face parameters, a face parameter value by processing a first portion of the user face that excludes the facial feature using a first machine learning system;

identify, for the segment, segment parameter values by processing a second portion of the user face that includes the facial feature and excludes the first portion of the user face using a second machine learning system that is separately trained from the first machine learning system to identify the segment parameter values for the facial feature, the second machine learning system trained using training data that includes corresponding segments of multiple user images that identify the facial feature in the multiple user images and known segment parameter values for the corresponding segments of caricature avatars corresponding to the multiple user images, the second machine learning system having been trained using the known segment parameter values that are changed from default values during manual generation of the caricature avatars while masking the known segment parameter values that are unchanged from the default values during the manual generation of the caricature avatars; and generate, from the face parameter values and the segment parameter values, a vector image that is a caricature avatar of a user depicted in the image.

14. The computing device of claim 13, wherein to generate the face parameter value, the multiple instructions cause the processor to generate the face parameter value using the first machine learning system trained using training data that includes a facial texture of each of the multiple user images and known face parameter values corresponding to each of the multiple user images.

15. The computing device of claim 14, the known face parameter values and the known segment parameter values having been generated manually by generating caricature avatars for users in the multiple user images.

16. The computing device of claim 13, wherein to identify the segment parameter values, the multiple instructions cause the processor to:

identify, using the second machine learning system, intermediary segment parameter values for the segment of the image;

determine one of the caricature avatars having the known segment parameter values with a smallest difference to the intermediary segment parameter values of the segment of the image; and determine, as the segment parameter values, the known segment parameter values of the determined one of the caricature avatars.

17. The computing device of claim 16, the training data includes a facial texture of the corresponding segments that identifying the facial feature in the multiple user images and the known segment parameter values.

18. The computing device of claim 13, wherein the multiple instructions further cause the processor to:

receive user input changing at least one of the face parameter values; and generate, from the face parameter values including the at least one changed face parameter value, a new caricature avatar of the user.

19. A non-transitory computer-readable medium storing executable instructions, which when executed by a processing device, cause the processing device to perform operations comprising:

generating a segment of an image that depicts a user face, wherein the segment identifies a facial feature of the user face;

identifying, for each of multiple face parameters, a face parameter value by processing a first portion of the user face that excludes the facial feature using a first machine learning system;

determining segment parameter values for the segment by processing a second portion of the user face that includes the facial feature and excludes the first portion of the user face using a second machine learning system that is separately trained from the first machine learning system to determine the segment parameter values for the facial feature, the second machine learning system trained using training data that includes corresponding segments of multiple user images that identify the facial feature in the multiple user images and known segment parameter values for the corresponding segments of caricature avatars corresponding to the multiple user images, the second machine learning system having been trained using the known segment parameter values that are changed from default values during manual generation of the caricature avatars while masking the known segment parameter values that are unchanged from the default values during the manual generation of the caricature avatars; and generating, from the face parameter values and the segment parameter values, a vector image that is a caricature avatar of a user depicted in the image.

20. The non-transitory computer-readable medium of claim 19, the operations further comprising:

receiving user input changing at least one of the face parameter values; and generating, from the face parameter values including the at least one changed face parameter value, a new caricature avatar of the user.

\* \* \* \* \*